United States Patent
Stephens et al.

(10) Patent No.: US 9,992,764 B2
(45) Date of Patent: *Jun. 5, 2018

(54) TRAINED DATA TRANSMISSION FOR COMMUNICATION SYSTEMS

(71) Applicant: Intel Corporation, Santa Clara, CA (US)

(72) Inventors: Adrian P. Stephens, Cambridge (GB); Eric A. Jacobsen, Scottsdale, AZ (US); Duncan M. Kitchin, Beaverton, OR (US); Sumeet Sandhu, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 289 days.

This patent is subject to a terminal disclaimer.

(21) Appl. No.: 13/912,802

(22) Filed: Jun. 7, 2013

(65) Prior Publication Data
US 2013/0336247 A1 Dec. 19, 2013

Related U.S. Application Data

(60) Continuation of application No. 12/894,495, filed on Sep. 30, 2010, now Pat. No. 8,478,201, and a (Continued)

(51) Int. Cl.
*H04W 72/04* (2009.01)
*H04W 74/08* (2009.01)
(Continued)

(52) U.S. Cl.
CPC ........... *H04W 72/04* (2013.01); *H04W 74/08* (2013.01); *H04W 72/08* (2013.01); *H04W 72/14* (2013.01)

(58) Field of Classification Search
CPC . H04W 72/0406; H04W 72/14; H04W 72/04; H04W 72/08; H04W 74/08;
(Continued)

(56) References Cited

U.S. PATENT DOCUMENTS 4,495,619 A 1/1985 Acampora
4,630,126 A 12/1986 Kaku et al.
(Continued)

OTHER PUBLICATIONS

Advisory Action Received for U.S. Appl. No. 10/719,208, dated May 24, 2007, 3 pages.
(Continued)

*Primary Examiner* — Candal Elpenord
*Assistant Examiner* — Ricardo Castaneyra
(74) *Attorney, Agent, or Firm* — Eversheds Sutherland (US) LLP

(57) ABSTRACT

Various embodiments are described for a trained data transmission for communication systems. A training phase may include a first wireless station exchanging medium reservation messages with a second wireless station to reserve a medium and to select a data transmission parameter. The data transmission parameter may include a modulation scheme and a forward error correction (FEC) coding rate. At least one of the medium reservation messages may include a duration field indicating a duration for which the medium is reserved. A first data phase may include sending data from the first wireless station to the second wireless station according to the selected data transmission parameter. A second data phase may then be performed without first repeating the training phase. The second data phase may include transmitting data from the first wireless station to a second wireless station according to the data transmission parameter.

18 Claims, 5 Drawing Sheets

Related U.S. Application Data continuation of application No. 12/109,002, filed on Apr. 24, 2008, now Pat. No. 7,826,798, and a division of application No. 10/719,208, filed on Nov. 20, 2003, now Pat. No. 7,373,112.

(51) Int. Cl.
*H04W 72/08* (2009.01)
*H04W 72/14* (2009.01)

(58) Field of Classification Search
CPC . H04W 84/12; H04W 84/18; H04W 74/0816; H04W 74/002; H04W 74/0808; H04W 74/04; H04W 72/0446; H04W 28/26; H04W 24/02; H04W 72/082; H04W 28/044; H04W 28/046
USPC ....... 370/329, 252, 328, 230, 235, 338, 254, 370/255, 350, 465
See application file for complete search history.

(56) References Cited

U.S. PATENT DOCUMENTS

| | | | |
|---|---|---|---|
| 4,797,898 A | | 1/1989 | Martinez |
| 5,007,047 A | | 4/1991 | Sridhar et al. |
| 5,231,634 A | * | 7/1993 | Giles .................. H04W 74/002 370/348 |
| 5,493,569 A | * | 2/1996 | Buchholz et al. ............ 370/442 |
| 5,577,087 A | | 11/1996 | Furuya |
| 5,581,578 A | | 12/1996 | De Bot |
| 5,828,695 A | | 10/1998 | Webb |
| 5,889,772 A | * | 3/1999 | Fischer ................. H04L 1/0021 370/346 |
| 6,920,121 B2 | | 7/2005 | Tan |
| 7,016,296 B2 | | 3/2006 | Hartman |
| 7,373,112 B2 | | 5/2008 | Stephens et al. |
| 2002/0054577 A1 | | 5/2002 | Gaskill et al. |
| 2002/0075830 A1 | * | 6/2002 | Hartman, Jr. ......... H04L 1/0003 370/333 |
| 2002/0155853 A1 | * | 10/2002 | Lee ...................... H04L 1/0009 455/522 |
| 2002/0163933 A1 | * | 11/2002 | Benveniste ............ H04L 47/10 370/465 |
| 2003/0040319 A1 | * | 2/2003 | Hansen ................. H04W 16/10 455/452.1 |
| 2004/0214582 A1 | | 10/2004 | Lan et al. |

OTHER PUBLICATIONS

Office Action Received for U.S. Appl. No. 10/719,208, dated Feb. 8, 2007, 23 pages.
Office Action Received for U.S. Appl. No. 10/719,208, dated Jul. 31, 2007, 19 pages.
Office Action received for U.S. Appl. No. 10/719,208, dated Oct. 2, 2006, 16 pages.
Notice of Allowance received for U.S. Appl. No. 10/719,208, dated Jan. 9, 2008, 11 pages.
Office Action received for U.S. Appl. No. 12/109,002, dated Mar. 8, 2010, 15 pages.
Notice of Allowance received for U.S. Appl. No. 12/109,002, dated Jun. 29, 2010, 8 pages.
Notice of Allowance received for U.S. Appl. No. 12/894,495, dated Mar. 1, 2013, 10 pages.
Office Action received for U.S. Appl. No. 12/894,495, dated Apr. 21, 2011, 16 pages.
Office Action received for U.S. Appl. No. 12/894,495, dated Feb. 13, 2012, 11 pages.
Office Action received for U.S. Appl. No. 12/894,495, dated May 25, 2012, 12 pages.
Office Action received for U.S. Appl. No. 12/894,495, dated Nov. 19, 2012, 13 pages.
Office Action received for U.S. Appl. No. 12/894,495, dated Oct. 6, 2011, 12 pages.
Dr. Gunter Kleindl, Signaling for Adaptive Modulation, IEEE 802.11-03/283r0, May 2003, pp. 1-12.
Grunheid et al., Adaptive Modulation for the HIPERLAN/2 Air Interface, 5th International OFDM-Workshop 2000, Hamburg Germany, pp. 4-1-4-4.

* cited by examiner

TRAINED DATA TRANSMISSION FOR COMMUNICATION SYSTEMS

CROSS REFERENCE TO RELATED APPLICATIONS

This application is a continuation of U.S. application Ser. No. 12/894,495, filed on Sep. 30, 2010, which is a continuation of U.S. application Ser. No. 12/109,002, filed on Apr. 24, 2008, (now U.S. Pat. No. 7,826,798, issued on Nov. 2, 2011), which is a divisional of U.S. application Ser. No. 10/719,208, filed on Nov. 20, 2003 (now U.S. Pat. No. 7,373,112, issued on May 13, 2008). In turn, U.S. application Ser. No. 10/719,208 claims priority to U.S. Provisional Application No. 60/493,937, filed on Aug. 8, 2003. These applications are incorporated herein by reference in their entirety.

BACKGROUND INFORMATION

Some communication systems may include features that may adapt to some types of changing conditions. For example, some systems allow a data transmission rate to be adjusted based upon a detected transmission condition. A need exists for an improved technique to allow a system to select or adapt a feature or parameter.

DETAILED DESCRIPTION

Figure 1:
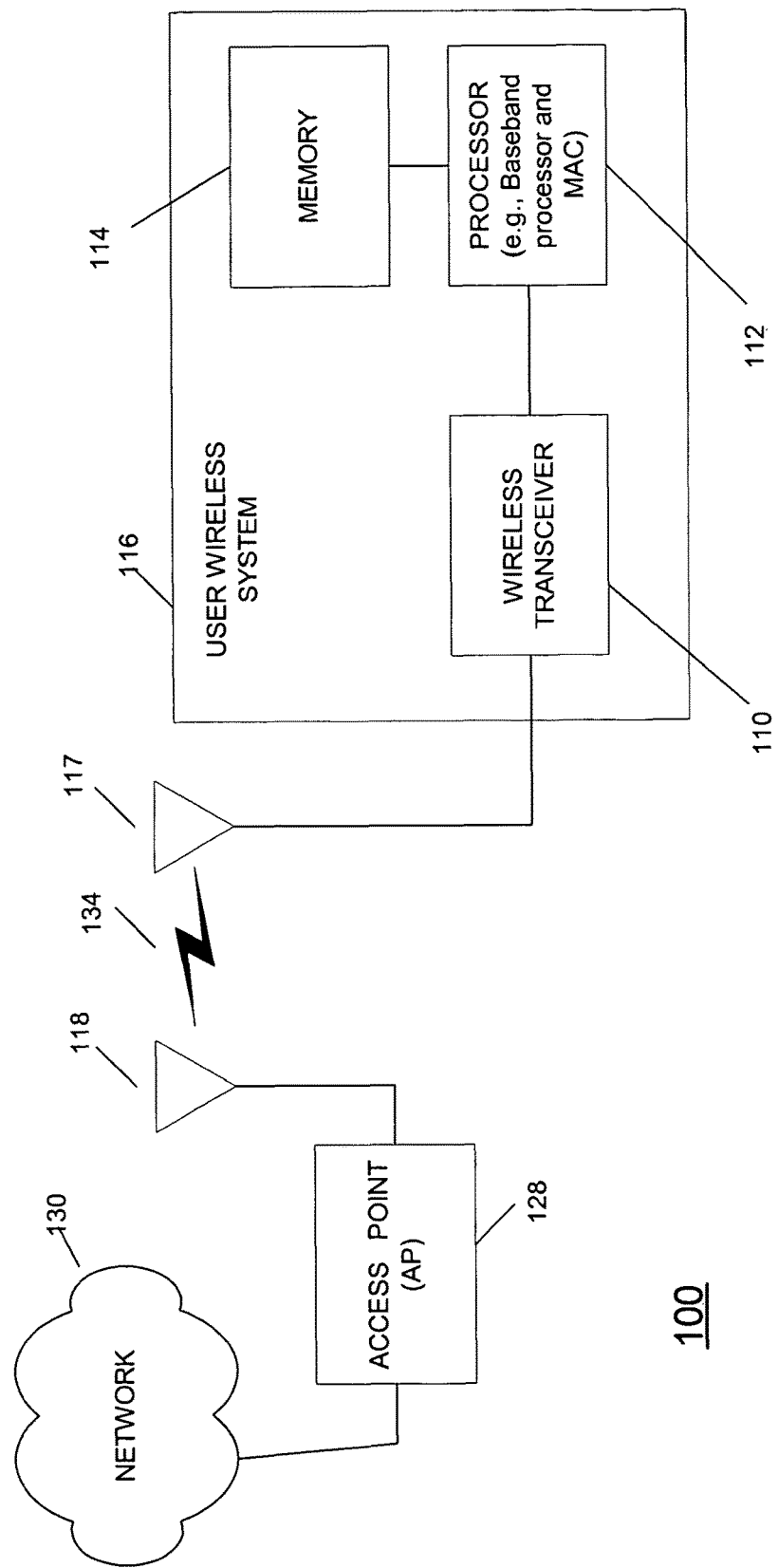
FIG. 1 is a diagram illustrating an example of a wireless communication system in accordance with an embodiment of the invention.

In the following detailed description, numerous specific details are set forth in order to provide a thorough understanding of the embodiments of the invention. It will be understood by those skilled in the art, however, that embodiments of the invention may be practiced without these specific details. In other instances, well-known methods, procedures and techniques have not been described in detail so as not to obscure the foregoing embodiments.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

Embodiments of the present invention may include apparatuses for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), flash memory, magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

It is worthy to note that any reference in the specification to "one embodiment" or "an embodiment" means in this context that a particular feature, structure, or characteristic described in connection with the embodiment may be included in at least one embodiment of the invention. The appearances of the phrase "in one embodiment" or "an embodiment" in various places in the specification do not necessarily refer to the same embodiment, but may be referring to different embodiments.

It should be understood that embodiments of the present invention may be used in a variety of applications. Although the present invention is not limited in this respect, the circuits disclosed herein may be used in many apparatuses such as in the transmitters and receivers of a radio system.

Radio systems intended to be included within the scope of the present invention include, by way of example only, wireless local area networks (WLAN) devices and wireless wide area network (WWAN) devices including wireless network interface devices and network interface cards (NICs), base stations, access points (APs), gateways, bridges, hubs, cellular radiotelephone communication systems, satellite communication systems, two-way radio communication systems, Time Division Multiple Access (TDMA) systems, and the like, although the scope of the invention is not limited in this respect.

As used herein, the term packet may include a unit of data that may be routed or transmitted between nodes or stations or across a network. As used herein, the term packet may include frames, protocol data units or other units of data. A packet may include a group of bits, which may include one or more address fields, control fields and data, for example. Likewise, the term message may include any information, and may include packets, frames, protocol data units or other units of data, or portions thereof.

Referring to the Figures in which like numerals indicate like elements, FIG. 1 is a diagram illustrating an example of a wireless communication system in accordance with one embodiment of the invention. In the communications system 100 shown in FIG. 1, a user wireless system 116 may include a wireless transceiver 410 coupled to an antenna 117 and to a processor 112. Processor 112 in one embodiment may comprise a single processor, or alternatively may comprise a baseband processor and an applications processor, although the scope of the invention is not limited in this respect. According to one embodiment, processor 112 may include a baseband processor and Medium Access Control (MAC).

Processor 112 may couple to a memory 114 which may include volatile memory such as DRAM, non-volatile memory such as flash memory, or alternatively may include other types of storage such as a hard disk drive, although the scope of the invention is not limited in this respect. Some portion or all of memory 114 may be included on the same integrated circuit as processor 112, or alternatively some portion or all of memory 114 may be disposed on an integrated circuit or other medium, for example a hard disk drive, that is external to the integrated circuit of processor 112, although the scope of the invention is not limited in this respect. According to one embodiment, software may be provided in memory 114 to be executed by processor 112 to allow wireless system 116 to perform a variety of functions, which may include one or more functions described below.

Wireless system 116 may communicate with an access point (AP) 128 (or other wireless system) via wireless communication link 134, where access point 128 may include at least one antenna 118. Although not shown in FIG. 1, AP 128 may, for example, include a structure that is similar to wireless system 116, including a wireless transceiver, a processor, a memory, and software provided in memory to allow AP 128 to perform a variety of functions. In an example embodiment, wireless system 116 and AP 128 may be considered to be stations in a wireless communication system, such as a WLAN system.

Access point 128 may be coupled to network 130 so that wireless system 116 may communicate with network 130, including devices coupled to network 130, by communicating with access point 128 via wireless communication link 134. Network 130 may include a public network such as a telephone network or the Internet, or alternatively network 130 may include a private network such as an intranet, or a combination of a public and a private network, although the scope of the invention is not limited in this respect.

Communication between wireless system 116 and access point 128 may be implemented via a wireless local area network (WLAN), for example a network which may be compliant with an Institute of Electrical and Electronics Engineers (IEEE) standard such as IEEE 802.11a, IEEE 802.11b, IEEE 802.11g, IEEE 802.11n and so on, although the scope of the invention is not limited in this respect. In addition, one or more aspects of the invention in some cases may be considered to be extensions to one or more current standards.

In another embodiment, communication between wireless system 116 and access point 128 may be implemented via a cellular communication network compliant with a 3GPP standard, although the scope of the invention is not limited in this respect.

Referring to FIG. 1, AP 128 may include a channel access control to control access to one or more communication channels between AP 128 and one or more wireless systems. In one embodiment, the AP 128, through its channel access control, may allow only one user (or one wireless system) to transmit data over a channel to the AP at a time. As examples, there may be only one channel over communication link 134, or there may be multiple channels over communication link 134 via use of frequency division multiplexing or other technique.

The wireless communication system of FIG. 1 may implement a technique to control access to the channel or transmission medium or to selectively grant users a transmit opportunity (TXOP), for example. According to an embodiment, a TXOP may be a time period (or alternatively a maximum amount of data) during which a wireless system may initiate transmission of data over the channel or transmission medium. This period of time for the TXOP may be fixed for all TXOPs, or may be adaptively changed by the AP, for example.

According to an example embodiment, wireless systems may obtain access to a transmission medium (e.g., obtain a TXOP) in a variety of different ways. According to one embodiment, a wireless system may obtain access to a transmission medium, for example, by receiving a poll packet from the AP 128 or other station. Alternatively, the user wireless system 116 may schedule one or more TXOPs in advance, such as by requesting TXOPs of a specified duration at requested times or at requested time intervals (e.g., schedule 5 ms TXOP, every 100 ms).

In another example embodiment, a wireless system may use a contention-based access technique, such as Carrier Sense Multi-Access-Collision Avoidance (CSMA-CA), or other distributed access technique to obtain access to the transmission medium. For example, a station may listen to (or sense) the medium. If the medium has been idle for a minimum period of time, the station may begin transmitting. If the medium is busy, the station may, for example, wait until the medium is idle and then wait a random number of quiet time slots before beginning to transmit. These are just a few examples of how a wireless system may obtain access to a transmission medium, although the invention is not limited thereto. Wireless communication systems or networks may use a variety of different channel access techniques.

In addition, after obtaining access to the transmission medium, the station may send a medium reservation message. For example, if the medium is quiet, the station may send a request to send (RTS) message. The AP (or other station) may reply with a clear to send (CTS) to confirm that the medium has been reserved for transmission.

Figure 2:
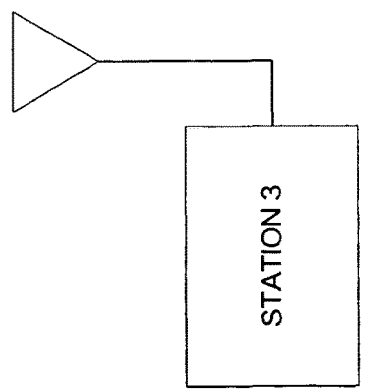
FIG. 2 is a block diagram illustrating an example network according to an embodiment.
Figure 2:
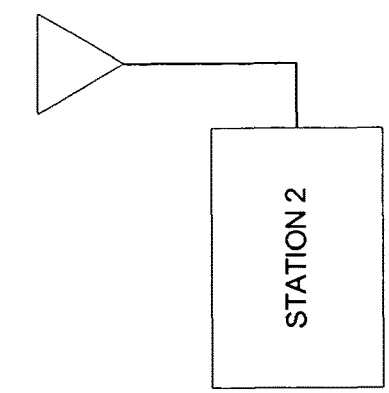
Figure 2:
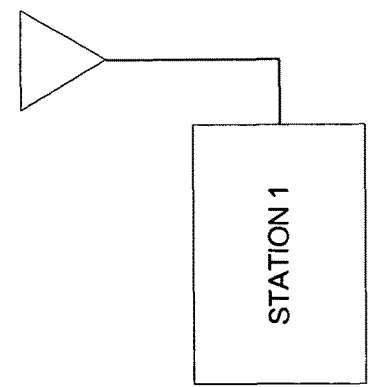

FIG. 2 is a block diagram illustrating an example network according to an embodiment. Network 200 may include one or more wireless stations, including, for example, station 1, station 2 and station 3. Each of the wireless stations in FIG. 2, including station 1, station 2 and station 3, may be, for example, a user wireless system (such as system 116), an access point (AP) (such as AP 128), although the invention is not limited to these types of stations. Stations 1-3 may be any type of wireless station.

Figure 3:
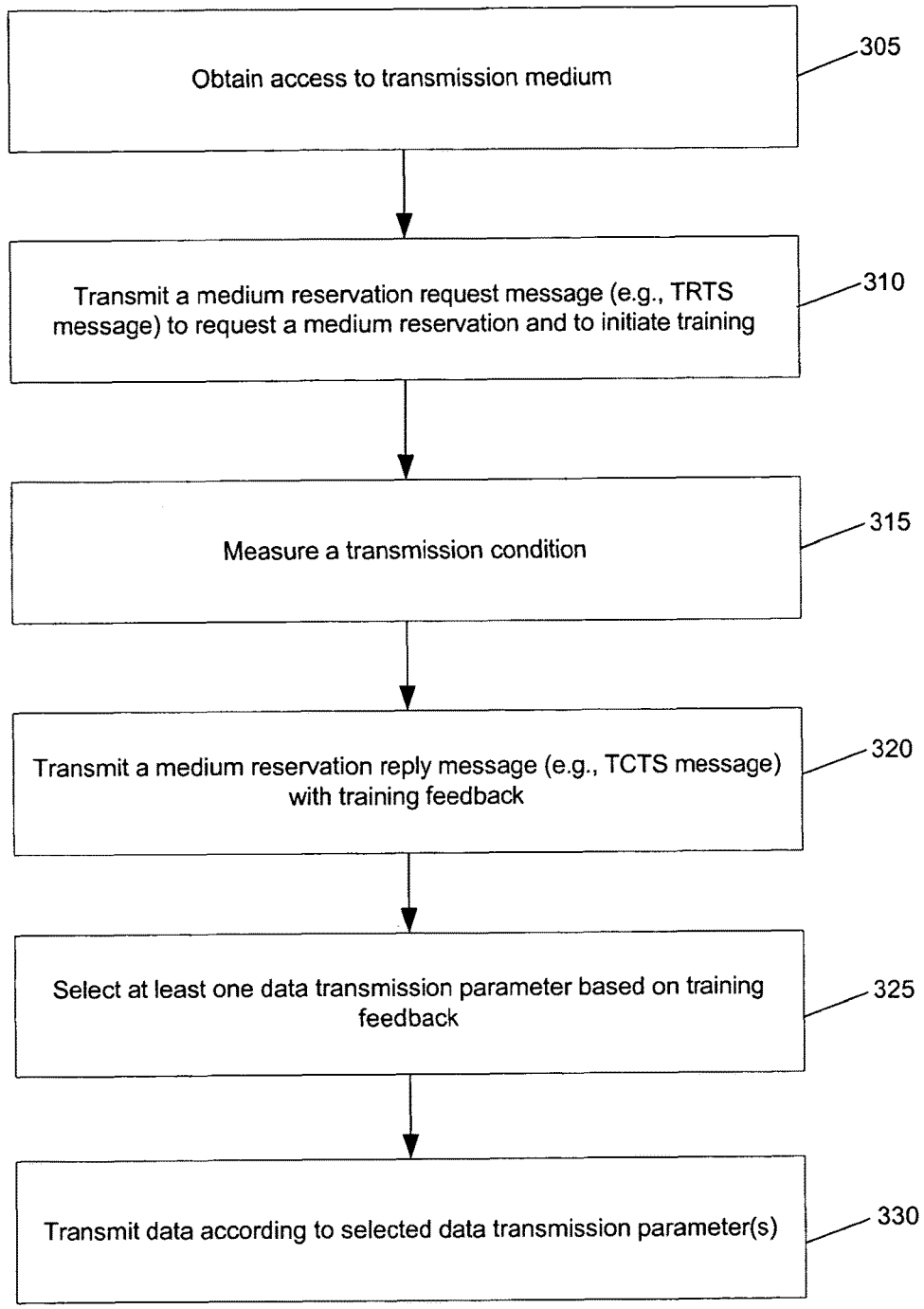
FIG. 3 is a flow chart illustrating operation of a system according to an example embodiment.

FIG. 3 is a flow chart illustrating operation of a network according to an example embodiment. At 305, station 1 (FIG. 2) may obtain access to a transmission medium. As noted above, a variety of different techniques may be used to obtain access to a channel or transmission medium, such as polling, contention based access, etc.

At 310, station 1 may send (or transmit) a medium reservation request message. According to an example embodiment, the medium reservation request message may include training information, although this is not required. According to an example embodiment, this medium reservation request message may be sent from station 1 to station 2 to perform two tasks: 1) to reserve the transmission medium (e.g., for a specified period of time); and 2) to initiate training. In an example embodiment, if training information is sent with the medium reservation message, such training information may be a known training sequence, although the invention is not limited thereto.

In an example embodiment, the medium reservation request message may be, a Request to Send (RTS) message, or the like, which additionally initiates training, and may include training information, although the invention is not limited thereto. This message may also include a duration field indicating the period of time for the requested medium reservation, although the invention is not limited thereto. Thus, such a message, which may both request a medium reservation and initiate training (and may also provide training information), is referred to herein as a Training Request To Send (TRTS) message.

At 315, station 2 may receive the TRTS message sent by station 1, which may include the training information. Station 2 may then measure a transmission condition. Various frequency bands or channels may receive various types of interference, noise, selective fading and other conditions which may degrade the quality of a channel, from time to time. Station 2 may detect a transmission condition (e.g., as detected by station 2), for example, of a particular frequency band or bands or channel(s), for a particular transmission path, for each antenna, etc., using a variety of different measurement techniques (e.g., using or based upon the training information). For example, station 2 may measure a transmission condition by measuring a bit error rate (BER) or average BER of the received signal (e.g., the received training sequence), by measuring a packet error rate or average packet error rate of the received signals, by measuring a signal to noise ratio (SNR) or average SNR for received signals, by measuring a received signal strength, etc., although the invention is not limited thereto. In another example embodiment, station 2 may measure a transmission condition based upon the training information provided in the TRTS message. These are just examples of how station 2 may measure the transmission condition, and many other types of measurements may be performed.

At 315, in a multicarrier system, such as an OFDM (Orthogonal Frequency Division Multiplexing) system for example, where information may be transmitted over multiple carriers or subcarriers, station 2 may measure a transmission condition for each (or one or more) of the different subcarriers (e.g., per subcarrier), although the invention is not limited thereto. A transmission condition may also be measured, for example, on a per-antenna basis where multiple antennas are used, such as received signal strength per antenna or SNR per antenna.

At 320, station 2 may transmit a medium reservation reply message to station 1 that may include training feedback. Several different types of training feedback may be provided within the medium reservation reply message. For example, the training feedback may include: 1) feedback that may describe the measured transmission condition(s) (e.g., the measured SNR, BER, packet error rate, signal strength), which in some example embodiments, may be provided on a per subcarrier basis, on a per antenna basis, etc.; and/or 2) feedback that may specify one or more transmission parameters for station 1 to use in transmitting data to station 2, although the invention is not limited thereto. In the latter case (feedback actually specifying a transmission parameter(s)), station 2 may measure a transmission condition, e.g., based on the training sequence, and then select one or more appropriate transmission parameters based on the measured transmission condition(s), and then send information identifying or specifying such transmission parameters to station 1 as training feedback within the medium reservation reply message, at 320. These are just some examples, and other types of training feedback may be used.

The transmission parameters that may be selected or specified may include, for example, transmission power, a code rate such as a FEC (forward error correction) code rate, decision to use interleaving (or type of interleaving used), a modulation scheme(s) and/or data rate, etc., although the invention is not limited thereto. In one example embodiment, one or more of such transmission parameters may be selected on a per-subcarrier basis, for example, transmission power per subcarrier, modulation scheme per subcarrier, coding rate per subcarrier, etc. Transmission parameters may also be selected on a per-antenna basis, where multiple antennas may be used at a transmitter or receiver.

In an example embodiment, the medium reservation reply message may be a Clear to Send (CTS) message or the like, which in some example embodiments may also include a duration field indicating the period of time for the requested medium reservation. In an example embodiment, the CTS message may also include the training feedback. Thus, in an example embodiment, the message sent by the station at 220 may be referred to herein as a Training Clear To Send (TCTS) message, although the invention is not limited thereto.

At 325, station 1 receives the TCTS message from station 2. As noted above, the TCTS message may include a field granting the requested media reservation and may also include the training feedback. Station 1 may then select (or adapt) one or more data transmission parameters based on the received training feedback. The transmission parameters that may be selected or adjusted may include, for example, the FEC code rate, decision to use interleaving (or type of interleaving used), a modulation scheme(s) and/or data rate, etc., although the invention is not limited thereto.

In an example embodiment, station 1 (and possibly other stations) may include an adaptive modulator and may select one (or more) modulation schemes selected from a group of modulation schemes, based upon the training feedback. The modulation schemes may include, for example, binary phase shift keying (BPSK), quadrature phase shift keying (QPSK) (four different symbols to encode 2 bits/symbol), 8-PSK (8 different symbols to encode 3 bits/symbol), quadrature amplitude modulation (QAM), QAM 16 (16 different symbols to encode 4 bits/symbol), QAM 32, QAM 64, QAM 256, etc. For example, higher modulation schemes may preferably be used when better transmission conditions are present (e.g., lower bit error rate or higher SNR). These are just a few example modulation schemes and the invention is not limited thereto.

Referring to FIG. 3, at 330, station 1 may then transmit data to station 2 or other station according to the one or more selected data transmission parameters. For example, the data may be transmitted using the selected modulation scheme and the selected FEC code rate, which in some cases, may be selected on a per-subcarrier basis (e.g., for each subcarrier), a per channel basis, on a per antenna basis, etc.

Figure 4:
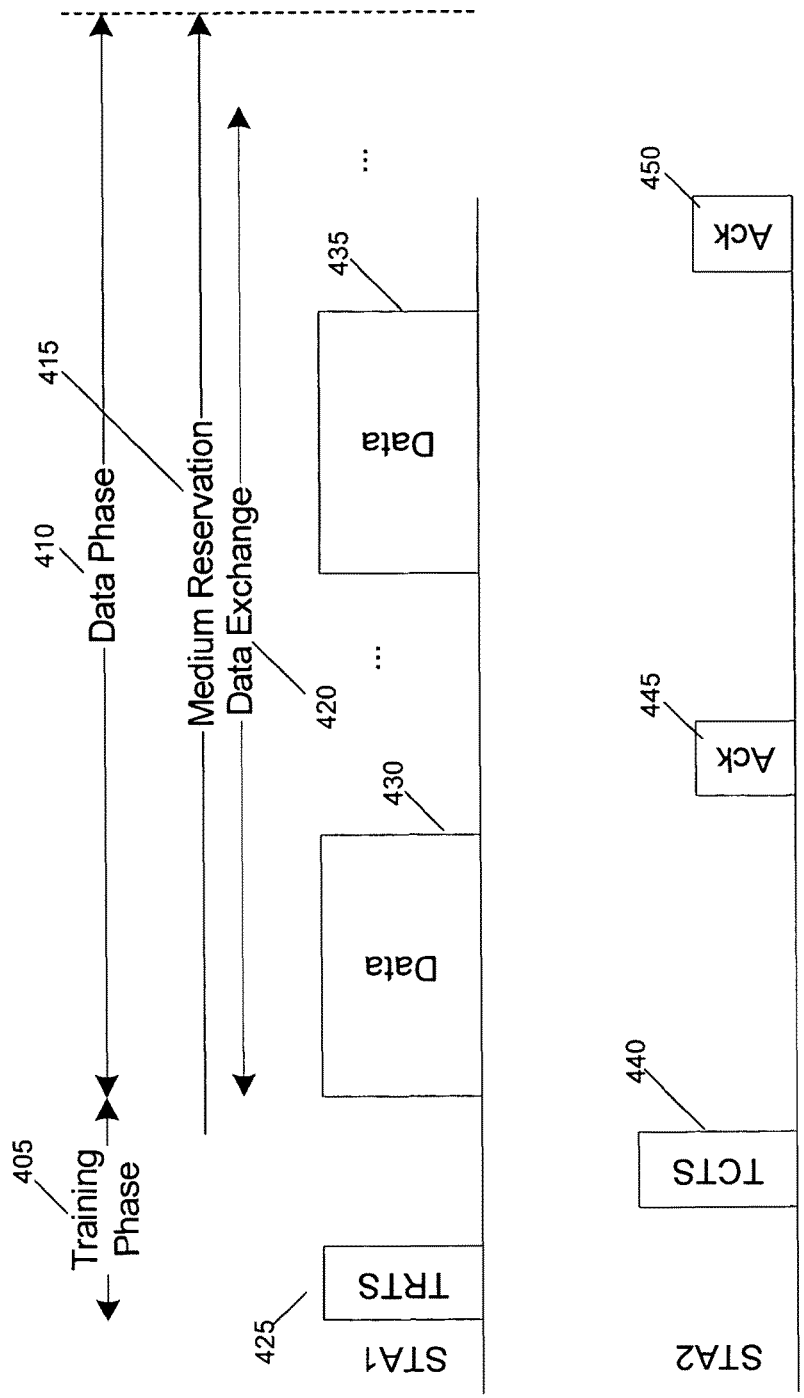
FIG. 4 is a diagram illustrating operation of a basic trained sequence according to an example embodiment.

FIG. 4 is a diagram illustrating operation of a basic trained sequence according to an example embodiment. The sequence 400 illustrated in FIG. 4 illustrates an exchange of messages between station 1 (STA1) and station 2 (STA2) to allow station 1 to be trained (e.g., to select or adapt one or more transmission parameters based on training feedback provided by station 2) and then exchange data. The sequence may include, for example, two phases: a training phase 405 where station 1 and station 2 may exchange messages to allow station 1 to be trained (e.g., to allow station 1 to select or adapt one or more transmission parameters); and a data phase 410 where data may be transmitted according to the selected transmission parameters.

In an example embodiment, the training phase 405 may begin whenever station 1 (STA1) gains access to the medium using whatever rules or access technique may be appropriate, such as through a polling access mechanism or a contention-based access mechanism, etc., although the invention is not limited thereto. Station 1 may then transmit a TRTS message 425 to station 2 (STA2). The TRTS message 425 may include a medium reservation request. The TRTS may be provided to request a medium reservation and to initiate a training. The TRTS message 425 may also include training information. Station 2 may receive this TRTS message 425 and then may measure a transmission condition. In an example embodiment, station 2 may measure the transmission condition based on the training information provided in the TRTS message 425, although the invention is not limited thereto. In addition, in an example embodiment, station 2 may also select one or more transmission parameters for station 1 to use in transmitting to station 2, based on the measured transmission condition, although the invention is not limited thereto.

Station 2 may then transmit a TCTS message 440 back to station 1. The TCTS message 440 may include a medium reservation reply, which may grant station 1 its medium reservation request. The TCTS message 440 may also include training feedback, which may include, for example, information describing a measured transmission condition or information actually specifying one or more transmission parameters that station 1 may preferably use for data transmission to station 2. This may complete the training phase 405.

The data phase 410 may then begin with station 1 transmitting one or more data packets 430, 435, which may be transmitted according to the one or more transmission parameters selected based on the training feedback. Station 2 may provide, for example, acknowledgements 445 and 450 to data packets 430 and 435, respectively. In an example, embodiment, data packets 430 and 435 may each include multiple data packets, and acknowledgements 445 and 450 may be selective acknowledgements to selectively acknowledge receipt of some of the data packets.

In one example, embodiment, the TRTS message 425 may include a duration field indicating a period of time for which the medium reservation is being requested. Likewise, the TCTS message 440 may also include a duration field to indicate the period of time for which the medium is being reserved for station 1. This duration field may be particularly useful where a third party station, such as station 3 (FIG. 2), may be unable to detect transmissions from station 1, but can detect transmissions from station 2. Station 3 may receive the TCTS message from station 2, including the duration field. Based upon receipt of the duration field in the TCTS, station 3 may preferably avoid transmitting or accessing the transmission medium through the data transmission phase, although the invention is not limited thereto. Thus, in such a case, the duration field in the TCTS may be detected by station 3 and therefore may decrease the likelihood of a collision between station 1 and station 3 (as measured at station 2).

In an example embodiment, there may be two types of stations (or devices), including legacy stations and non-legacy stations. A legacy station typically does not participate in the training process and may not be able to demodulate or decode all fields or portions of TRTS and TCTS messages. A non-legacy station may participate in training and may generate and respond to TRTS and TCTS messages.

In an example embodiment, the TRTS and TCTS messages may be untrained type messages (e.g., packets), which may not have transmission parameters for these messages selected or varied based upon training. Therefore, in an example embodiment, the untrained messages typically do not rely on a training process to vary or select their transmission parameter(s). In an example embodiment, the data packets 430 and 435 may be trained type messages since these packets may rely on a prior training process and may be transmitted using one or more transmission parameters selected or communicated by its intended receiver or selected based on a measured transmission condition.

The acknowledgements 445 and 450 may be, for example, either untrained or trained type of messages.

In an alternative embodiment, the TRTS and the TCTS messages may be a legacy-compatible untrained type of message. In an example embodiment, a legacy-compatible untrained type of message may include a legacy portion, such as a valid legacy message, plus an additional training portion, although the invention is not limited thereto. The training portion of the legacy-compatible untrained type of message may include, for example, training information or training feedback. The training portion may be transmitted in the mixed type of message as one or more additional fields (e.g., in addition to the valid legacy message), by using channels or subcarriers not used by the legacy device, or other technique. According to example embodiments, the training information may be a training sequence or other information to allow a station to measure a transmission condition, while training feedback may, for example, describe a measured transmission condition(s) or may specify one or more transmission parameters, although the invention is not limited thereto. In another example embodiment, the TRTS message may be a mixed type of message, while the TCTS may be either a mixed or legacy type of message. A legacy type of message may be for example a message used by legacy type stations. In an example embodiment, a legacy type message may typically be demodulated and decoded by legacy devices as well as non-legacy devices that participate in training via TRTS and TCTS messages.

Figure 5:
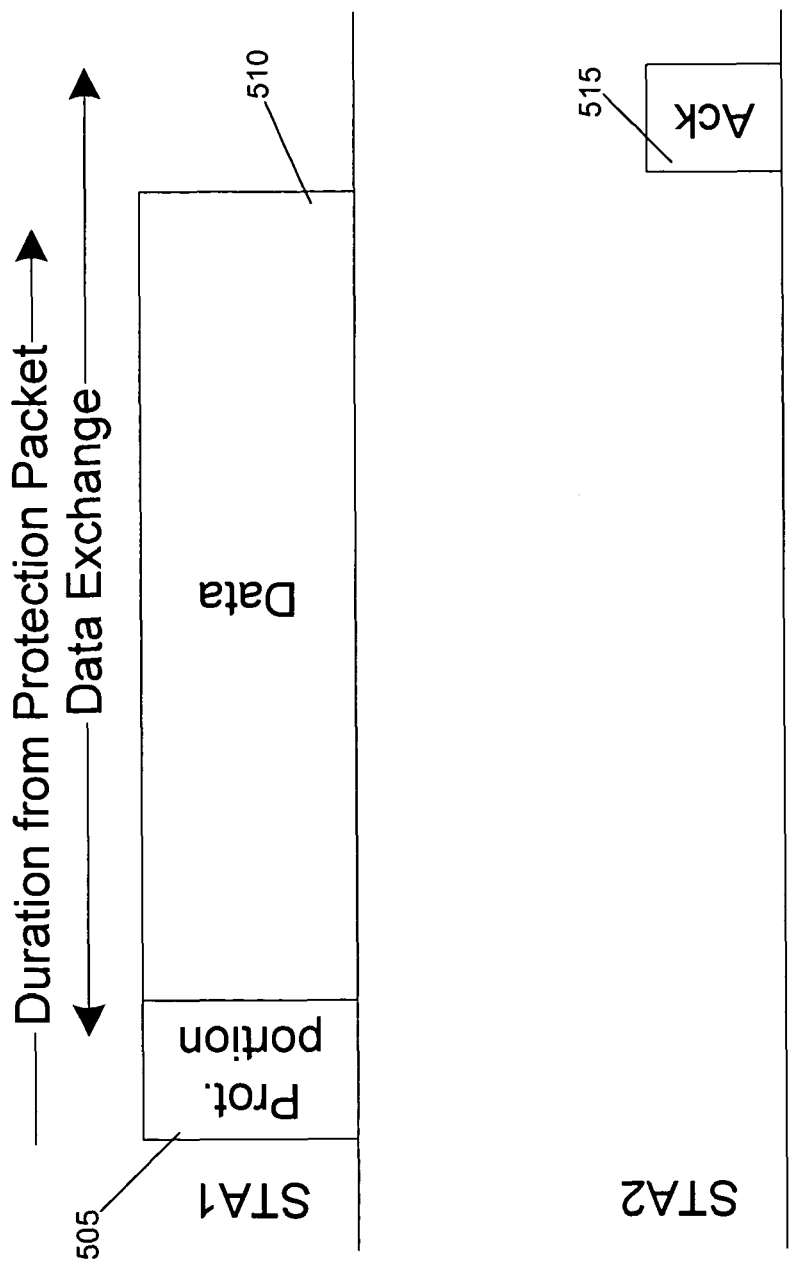
FIG. 5 is a diagram illustrating operation of a trained sequence that uses a protection field according to an example embodiment.

FIG. 5 is a diagram illustrating operation of a trained sequence that uses a protection field. As noted above, the TRTS and TCTS messages may include a duration field that may indicate the time period for the medium reservation. This duration field, in some cases, may protect against collisions caused by third party stations or hidden nodes. The duration field in the TRTS and TCTS messages, for example, may inform the third party station to avoid transmitting over the medium until the reservation has ended.

Referring to FIG. 5, in some cases, a station may elect not to precede a new data phase with a training phase. For example, the station may determine that the previously selected transmission parameters can be used and thus, the overhead and delay associated with the training phase may be omitted, although the invention is not limited thereto. In such a case, a station may precede a data phase 510 (or transmission of data packets) with a protection portion 505. Station 2 may generate an acknowledgement 515.

The protection portion 505 may be information that indicates a medium reservation for a period of time. This protection portion may include, for example, a duration field, or a portion of the legacy packet that may include a duration field, or a legacy packet that includes a duration field, although the invention is not limited thereto. The duration portion (e.g., duration field) may inform other devices (including legacy devices) that the medium has been reserved for the specified period of time, although the invention is not limited thereto. Therefore, in a case where a new data phase or new data packets are being transmitted without a corresponding training phase, a protection portion (e.g., protection field or protection packet) may be transmitted prior to transmitting the data to assist in protecting this new data phase against collisions from third party stations.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method, comprising:
performing a training phase, wherein the training phase includes an exchange of medium reservation messages with a first wireless station and a second wireless station, wherein the training phase further includes:
reserving a medium for a duration, wherein at least a first one of the medium reservation messages includes a duration field indicating the duration, and
selecting at least one data transmission parameter for each of a plurality of distinct subcarriers in a multicarrier system, wherein the at least one data transmission parameter includes a modulation scheme and a forward error correction (FEC) coding rate, wherein the modulation scheme is selected based on training information of at least a second one of the medium reservation messages that is sent by the first wireless station;
performing a first data phase including causing to send first data by the first wireless station to the second wireless station according to the at least one data transmission parameter selected during the training phase; and performing a second data phase without first repeating the training phase, wherein the second data phase includes:
causing to send a protection packet by the first wireless station to the second wireless station, and
causing to send second data by the first wireless station to the second wireless station according to the at least one data transmission parameter selected during the training phase, wherein the protection packet protects the second data phase against collisions from one or more third party wireless stations.

2. The method of claim 1, wherein the training phase comprises the first wireless station receiving an indication from the second wireless station of the at least-one data transmission parameter.

3. The method of claim 1, wherein the at least one data transmission parameter corresponds to a plurality of antennas.

4. The method of claim 3, wherein the plurality of antennas correspond to the second wireless station.

5. The method of claim 1, wherein the first wireless station and the second wireless station are included in an IEEE 802.11 wireless network.

6. The method of claim 5, wherein the second wireless station is an access point (AP).

7. An apparatus of a first wireless station, comprising a processor and a wireless transceiver, the apparatus adapted to:
perform a training phase, wherein the training phase includes an exchange of medium reservation messages with a second wireless station, wherein the training phase further includes:
reservation of a medium for a duration, wherein at least a first one of the medium reservation messages includes a duration field indicating the duration, and
selection of at least one data transmission parameter for each of a plurality of distinct subcarriers in a multicarrier system, wherein the at least one data transmission parameter includes a modulation scheme and a forward error correction (FEC) coding rate, wherein the modulation scheme is selected based on training information of at least a second one of the medium reservation messages that is sent by the first wireless station;
perform a first data phase including causing to send first data to the second wireless station according to the at least one data transmission parameter selected during the training phase; and
perform a second data phase without first repeating the training phase, wherein the second data phase includes:
causing to transmit a protection packet to the second wireless station, and
causing to transmit second data to the second wireless station according to the at least one data transmission parameter selected during the training phase, wherein the protection packet protects the second data phase against collisions from one or more third party wireless stations.

8. The apparatus of claim 7, wherein the training phase comprises the first wireless station receiving from the second wireless station an indication of the at least one data transmission parameter.

9. The apparatus of claim 7, wherein the at least one data transmission parameter corresponds to a plurality of antennas.

10. The apparatus of claim 9, wherein the plurality of antennas correspond to the second wireless station.

11. The apparatus of claim 7, wherein the first wireless station and the second wireless station are included in an IEEE 802.11 wireless network.

12. The apparatus of claim 11, wherein the second wireless station is an access point (AP).

13. A product including one or more tangible computer-readable non-transitory storage media comprising computer-executable instructions operable to, when executed by at least one computer processor, enable the at least one computer processor to implement a method at a wireless device, the method comprising:
performing a training phase, wherein the training phase includes an exchange of medium reservation messages with a first wireless station and a second wireless station, wherein the training phase further includes:
reserving a medium for a duration, wherein at least a first one of the medium reservation messages includes a duration field indicating the duration, and
selecting at least one data transmission parameter for each of a plurality of distinct subcarriers in a multicarrier system, wherein the at least one data transmission parameter includes a modulation scheme and a forward error correction (FEC) coding rate, wherein the modulation scheme is selected based on training information of at least a second one of the medium reservation messages that is sent by the first wireless station;
performing a first data phase including causing to send first data by the first wireless station to the second wireless station according to the at least one data transmission parameter selected during the training phase; and
performing a second data phase without first repeating the training phase, wherein the second data phase includes:
causing to send a protection packet by the first wireless station to the second wireless station, and
causing to send second data by the first wireless station to the second wireless station according to the at least one data transmission parameter selected during the training phase, wherein the protection packet protects the second data phase against collisions from one or more third party wireless stations.

14. The product of claim 13, wherein the training phase comprises the first wireless station receiving an indication from the second wireless station of the at least one data transmission parameter.

15. The product of claim 13, wherein the at least one data transmission parameter corresponds to a plurality of antennas.

16. The product of claim 15, wherein the plurality of antennas correspond to the second wireless station.

17. The product of claim 13, wherein the first wireless station and the second wireless station are included in an IEEE 802.11 wireless network.

18. The product of claim 17, wherein the second wireless station is an access point (AP).

* * * * *